United States Patent
Pettersson et al.

(10) Patent No.: US 12,307,622 B2
(45) Date of Patent: May 20, 2025

(54) METHOD AND DEVICE FOR DEWARPING A REGION OF A FISHEYE VIEW IMAGE

(71) Applicant: Axis AB, Lund (SE)

(72) Inventors: Ludvig Pettersson, Lund (SE); Jiandan Chen, Lund (SE); Hanna Björgvinsdóttir, Lund (SE)

(73) Assignee: AXIS AB, Lund (SE)

( * ) Notice: Subject to any disclaimer, the term of this patent is extended or adjusted under 35 U.S.C. 154(b) by 455 days.

(21) Appl. No.: 17/835,254

(22) Filed: Jun. 8, 2022

(65) Prior Publication Data

US 2022/0398687 A1 Dec. 15, 2022

(30) Foreign Application Priority Data

Jun. 10, 2021 (EP) .................................... 21178765

(51) Int. Cl.
*G06T 3/047* (2024.01)
*G06T 3/18* (2024.01)

(52) U.S. Cl.
CPC ............... *G06T 3/047* (2024.01); *G06T 3/18* (2024.01)

(58) Field of Classification Search
None
See application file for complete search history.

(56) References Cited

U.S. PATENT DOCUMENTS

| | | |
|---|---|---|
| 6,243,131 B1 | 6/2001 | Martin |
| 6,687,387 B1 | 2/2004 | Molnar et al. |
| 9,479,732 B1 | 10/2016 | Saleh et al. |
| 2004/0032649 A1 | 2/2004 | Kondo et al. |
| 2018/0374200 A1* | 12/2018 | Taoki ........................ G06T 7/73 |
| 2021/0118094 A1 | 4/2021 | Boyce |

FOREIGN PATENT DOCUMENTS

| | | | |
|---|---|---|---|
| KR | 10-2014-0117808 A | | 10/2014 |
| KR | 20190118076 A | * | 10/2019 |

OTHER PUBLICATIONS

Extended European Search Report dated Dec. 8, 2021 for European Patent Application No. 21178765.0.
Tai et al., "A Fully Automatic Approach for Fisheye Camera Calibration," 2018 IEEE Visual Communications and Image Processing (VCIP), (2018).

* cited by examiner

*Primary Examiner* — Vincent Rudolph
*Assistant Examiner* — Meredith Taylor
(74) *Attorney, Agent, or Firm* — Volpe Koenig (57) ABSTRACT

A method for dewarping a region of a fisheye view image, captured by a fisheye lens wherein the fisheye view image comprises a first dewarping pole, DP1. The method defines a region of interest, ROI, determining a center, G, of the ROI, defining a temporary annulus sector region such that the temporary annulus sector region comprises the ROI, and has its center at DP1 and has a temporary outer arc shaped edge and a temporary inner arc shaped edge, defining a second dewarping pole, DP2 at a distance, D, from DP1 along a radial direction extending from G of the ROI through the DP1, setting a dewarping annulus sector region comprising the ROI. The dewarping annulus sector region has its center at DP2 and has its dewarping inner arc shaped edge maintained at a same radial distance from DP1 as the temporary inner arc shaped edge.

13 Claims, 5 Drawing Sheets

METHOD AND DEVICE FOR DEWARPING A REGION OF A FISHEYE VIEW IMAGE

FIELD OF INVENTION

The present disclosure belongs to methods and devices for dewarping a region of a fisheye view image.

TECHNICAL BACKGROUND

A fisheye view image is an image having a wide field of view. Such a fisheye view image is captured by a fisheye lens to monitor a surrounding environment. Naturally, however, a fisheye view image is distorted due to the wide-angle capture of the surrounding environment, thereby obscuring object features of an object in the image, the degree of distortion being dependent on a position in the fisheye view image. To make features of an object less obscured, the fisheye view image may be dewarped to, at least partly, recover the true geometry of the object. While dewarping of regions in fisheye view images is known in the art, there is need for an improved approach for dewarping a region of a fisheye view image such that it is safeguarded that features of the objects in the dewarped region is more friendly for human visualization and possibly also for application of an object detection, object classification, and/or object recognition algorithm on the features of the object in the dewarped region.

SUMMARY

Thus, it is an object of the disclosure to provide an improved approach for dewarping a region of a fisheye view image.

According to a first aspect, there is provided a computer implemented method for dewarping a region of a fisheye view image, wherein the fisheye view image is captured by a fisheye lens camera and comprises a first dewarping pole, DP1, the method comprising:
  defining a region of interest, ROI, within the fisheye view image,
  determining a center, G, of the ROI,
  defining a temporary annulus sector region of the fisheye view image such that the temporary annulus sector region comprises the ROI, and such that the temporary annulus sector region has its center at DP1 and has a temporary outer arc shaped edge and a temporary inner arc shaped edge,
  defining a second dewarping pole, DP2, in the fisheye view image at a dewarping pole moving distance, D, from DP1 along a radial direction extending from G of the ROI through the DP1,
  setting a dewarping annulus sector region of the fisheye view image such that the dewarping annulus sector region comprises the ROI, and such that the dewarping annulus sector region has its center at DP2 and has its dewarping inner arc shaped edge maintained at a same radial distance from DP1 as the temporary inner arc shaped edge, and
  dewarping the dewarping annulus sector region of the fisheye view image.

The ROI may comprise an object to be used in an object detection, object classification, and/or object recognition algorithm. The algorithm(s) may be performed after a dewarping of the ROI has been performed, thereby providing a less distorted image on which the algorithm(s) is/are performed. Hence, the algorithm(s) may become more robust.

Further, the dewarped image may become more friendly for human visualization when viewing the image or a video stream of images.

Further, the present disclosure may provide a computationally efficient approach for dewarping a portion of a fisheye view image. This may allow for an accurate object detection, classification and/or recognition being performed in real time. Hence, computation time and computer power may be saved.

The dewarping annulus sector region may be set such that its dewarping outer arc shaped edge is maintained at a same radial distance from DP1 as the temporary outer arc shaped edge. Hence, an efficient setting of the dewarping outer arc shaped edge is provided, which may save processing time and/or processing power.

The method may further comprise calculating D to be equal to a radial distance, R, between G of the ROI and a point, P1, on an edge of the fisheye view image such that DP2, G and P1 are located on a same straight line, wherein G is located between DP2 and P1. This preserves symmetry between the temporary annulus sector region and the dewarping annulus sector region, thereby facilitating an efficient dewarping of the ROI. Hence, again, processing time and/or processing power may be saved.

The method may further comprise calculating D to be equal to a radial distance, R, between G of the ROI and a point, P1, on an edge of the fisheye view image such that DP2, G and P1 are located on a same straight line, wherein G is located between DP2 and P1, wherein a tolerance of the dewarping pole moving distance D may be a radial extension, $R_{ROI}$, of the ROI such that $$R-R_{ROI}<D<R+R_{ROI}.$$

This may provide flexibility of the method.

The definition of DP2 may comprise:
calculating a temporary arc ratio by either of:
  a length of the temporary outer arc shaped edge divided by a length of the temporary inner arc shaped edge, or
  a length of a line segment joining a first and a second endpoint of the temporary outer arc shaped edge divided by a length of a line segment joining a first and a second endpoint of the temporary inner arc shaped edge, comparing the temporary arc ratio with a threshold arc ratio,
provided the temporary arc ratio exceeds the threshold arc ratio, calculating D by requiring a dewarping arc ratio to be equal to or below the threshold arc ratio, the dewarping arc ratio being calculated by either of:
  a length of the dewarping outer arc shaped edge divided by a length of the dewarping inner arc shaped edge, or
  a length of a line segment joining a first and a second endpoint of the dewarping outer arc shaped edge divided by a length of a line segment joining a first and a second endpoint of the dewarping inner arc shaped edge.

This allows for a fast and accurate location calculation of the DP2, thereby processing time and/or processing power may be saved.

The dewarping of the dewarping annulus sector region of the fisheye view image may comprise, by a coordinate transformation, calculating a transformation from a spherical-coordinate representation of the dewarping annulus region to a rectilinear-coordinate representation projection of the dewarping annulus region, the dewarping annulus sector region thereby being an equirectangular projection of the fisheye view image.

The threshold arc ratio may be a set of threshold arc ratios, wherein each threshold arc ratio of the set of threshold arc ratios belongs to a specific annulus region of a field of view, FOV, of the fisheye lens camera. As a fisheye view image generally is associated with a position dependent degree of distortion, different regions of the fisheye view image being associated with different threshold arc ratios may enhance an accurate dewarping of respective regions, thereby facilitating object detection.

According to a second aspect, there is provided a non-transitory computer-readable storage medium having stored thereon instructions for implementing the method according to the first aspect, when executed on a device having processing capabilities.

The above-mentioned features and advantages of the method, when applicable, apply to this second aspect as well. In order to avoid undue repetition, reference is made to the above.

According to a third aspect, there is provided an electronic device comprising circuitry configured to execute:
a region of interest, ROI, defining function configured to define a ROI within a fisheye view image,
a center determining function configured to determine a center of the ROI,
a temporary annulus sector region defining function configured to define a temporary annulus sector region of the fisheye view image such that the temporary annulus sector region comprises the ROI, and such that the temporary annulus sector region has its center at a first dewarping pole, DP1, of the fisheye view image and has a temporary outer arc shaped edge and a temporary inner arc shaped edge,
a dewarping pole defining function configured to define a second dewarping pole, DP2, in the fisheye view image at a dewarping pole moving distance, D, from DP1 along a radial direction extending from G of the ROI through the DP1,
a dewarping annulus sector region setting function configured to set a dewarping annulus sector region of the fisheye view image such that the dewarping annulus sector region comprises the ROI, and such that the dewarping annulus sector region has its center at DP2 and has its dewarping inner arc shaped edge maintained at a same radial distance from DP1 as the temporary inner arc shaped edge, and
a dewarping function configured to dewarp the dewarping annulus sector region of the fisheye view image.

The above-mentioned features and advantages of the method, when applicable, apply to this third aspect as well. In order to avoid undue repetition, reference is made to the above.

The dewarping annulus sector region setting function may comprise a shifting function configured to set the dewarping annulus sector region such that its dewarping outer arc shaped edge is maintained at a same radial distance from DP1 as the temporary outer arc shaped edge.

The circuitry may further be configured to execute
a distance calculating function configured to calculate D to be equal to a radial distance, R, between G of the ROI and a point, P1, on an edge of the fisheye view image such that DP2, G and P1 are located on a same straight line, wherein G is located between DP2 and P1.

The dewarping pole defining function may further be configured to, by a distance calculating function configured to calculate D to be equal to a radial distance, R, between G of the ROI and a point, P1, on an edge of the fisheye view image such that DP2, G and P1 are located on a same straight line, wherein G is located between DP2 and P1, include a tolerance of the dewarping pole moving distance D being a radial extension, $R_{ROI}$, of the ROI such that:

$$R - R_{ROI} < D < R + R_{ROI}.$$

The dewarping pole defining function may comprise:
a temporary arc ratio calculating function configured to calculate a temporary arc ratio by either of:
a length of the temporary outer arc shaped edge divided by a length of the temporary inner arc shaped edge, or
a length of a line segment joining a first and a second endpoint of the temporary outer arc shaped edge divided by a length of a line segment joining a first and a second endpoint of the temporary inner arc shaped edge,
a comparing function configured to compare the temporary arc ratio with a threshold arc ratio,
an arc ratio condition function configured to, provided the temporary arc ratio exceeds the threshold arc ratio, calculate D by requiring a dewarping arc ratio to be equal to or below the threshold arc ratio, wherein the dewarping arc ratio is calculated by either of:
a length of the dewarping outer arc shaped edge divided by a length of the dewarping inner arc shaped edge, or
a length of a line segment joining a first and a second endpoint of the dewarping outer arc shaped edge divided by a length of a line segment joining a first and a second endpoint of the dewarping inner arc shaped edge.

The fisheye lens image may be an equirectangular projection of an environment comprising the dewarping annulus region, and wherein the dewarping function is further configured to, by a coordinate transformation, calculate a transformation from the equirectangular projection of the dewarping annulus region to a rectilinear projection of the dewarping annulus region.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments, with reference to the appended drawings, where the same reference numerals will be used for similar elements, wherein.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
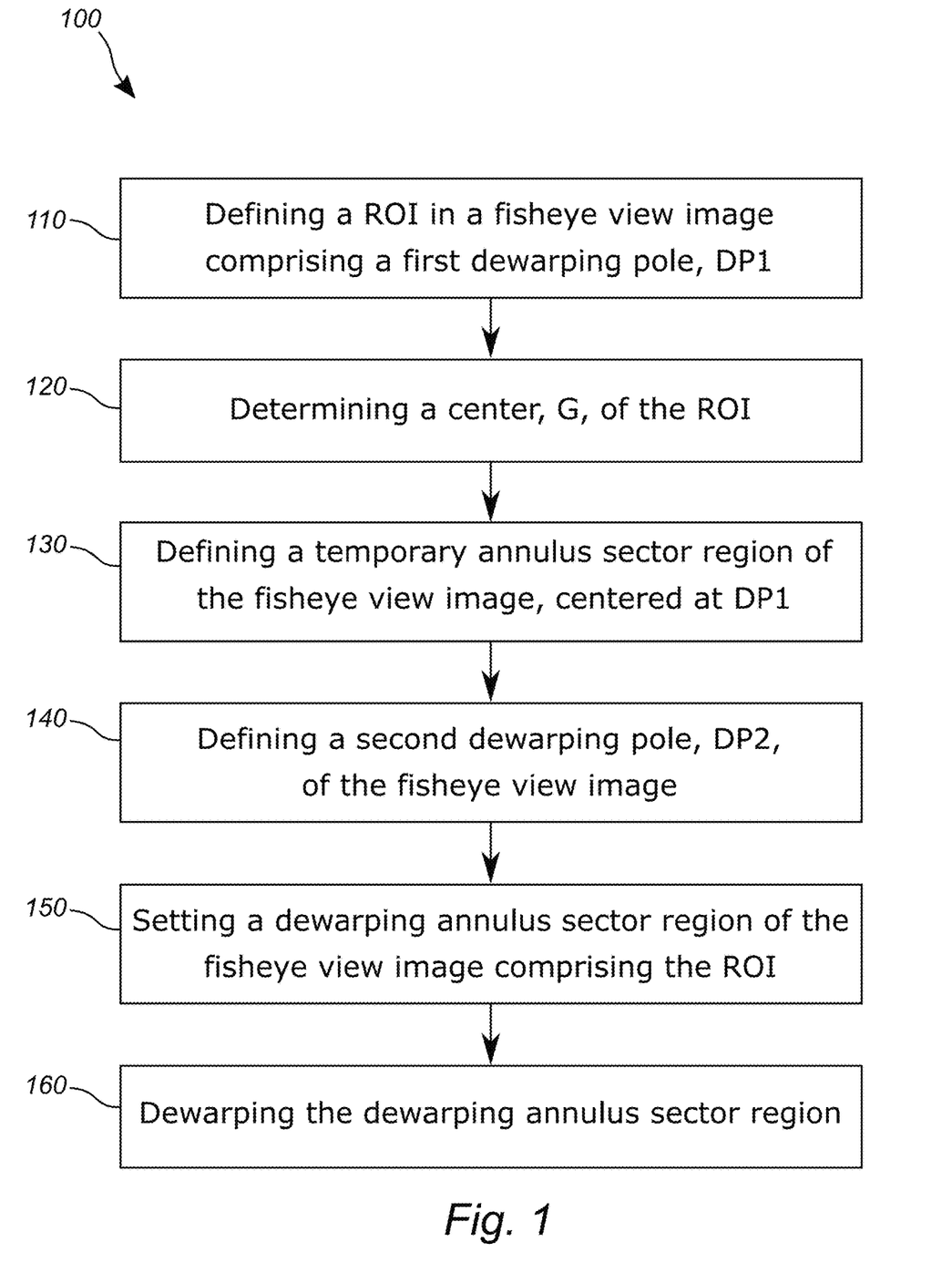
FIG. 1 shows a flowchart of a method for dewarping a region in a fisheye view image.

FIG. 1 schematically shows a flowchart of an example of a method 100 for dewarping a region of a fisheye view image 200, wherein the fisheye view image is captured by a fisheye lens camera and comprises a first dewarping pole, DP1. DP1 may be an optical center of the fisheye view image 200. However, as readily understood by the skilled person DP1 may be set according to other criteria as well. FIG. 1 may advantageously be viewed together with FIGS. 2 and 3 below. The fisheye view image 100 may be acquired by a camera having mounted thereon any adequate type of fisheye lens, such as a circular. APS-C type, a full-frame APS-C type, a zoom APS-C type, a circular type, a full-frame type, a zoom type, etc. Preferably, raw data of the fisheye view image 200 is such that an edge of a set of activated pixels forms a substantially circular geometry, such that the first dewarping pole, DP1, may be viewed as an origin of a polar coordinate system of the fisheye view image. Hence, any pixel in the fisheye view image 200 may be associated with a polar coordinate, thereby having a radial variable and an angular variable. The polar coordinate system may equivalently be represented in a complex plane. It is to be noted that a dewarping of the fisheye view image 200 generally require considering spherical coordinates, i.e., an additional angular variable, to be dewarped onto an equirectangular projection. This will be further described below.

Figure 2:
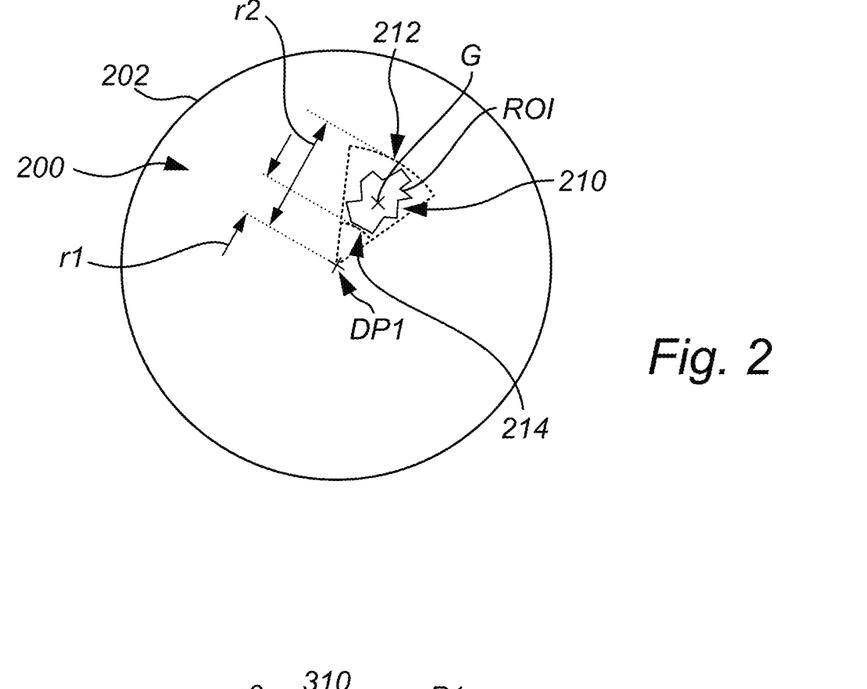
FIG. 2 schematically shows a fisheye view image.

The method 100 comprises defining 110 a region of interest, ROI, within the fisheye view image 200. The ROI may be acquired from an image segmentation algorithm, an edge detection algorithm, etc., applied to the fisheye image 200. The ROI may comprise an object in the fisheye view image 200. By way of example, the ROI may comprise a car, a truck, a person, etc. The ROI preferably substantially enclose an edge of the object, such as the car, the truck, or the person, to possibly be subsequently processed in an object detection, an object classification, and/or an object recognition algorithm. Preferably, the ROI entirely enclose the edge of the object. Alternatively, the ROI may comprise a plurality of nearby objects. Examples thereof may be a group of people, a person riding on a bike, or the like. The same may apply for a ROI comprising a plurality of nearby objects, i.e., such a ROI may substantially enclose an edge of the plurality of nearby objects. For, e.g., a group of people this may imply that the group of people may be enclosed by a polygon possibly being optimized to minimize an area of the ROI.

The method 100 further comprises determining 120 a center, G, of the ROI. G can be calculated, or at least estimated, using any calculation method, such as methods based on pixels enclosed by the edge of the ROI and positions of these pixels, etc. The center, G, may be a center of gravity of the ROI. Alternatively, the center, G, may be a center of a temporary annulus sector region 210, further described below. In such a situation, the center, G, may be located on a radially and angularly centered point of the temporary annulus sector region 210. Alternatively, provided the ROI is defined in a coordinate system having a radial and an angular coordinate associated with it, a radial coordinate of the center, G, may be a mean value of a maximal radial extension of the ROI, and an angular coordinate of the center, G, may be a mean value of a maximal angular extension of the ROI. In the event the center, G, is a center of gravity of the ROI, it is appreciated that the center, G, may be located outside an edge of the ROI, should the ROI have a highly irregular geometry. The same may be true regarding the alternative procedures of determining the center, G.

The method 100 further comprises defining 130 a temporary annulus sector region 210 of the fisheye view image 200 such that the temporary annulus sector region 210 comprises the ROI, and such that the temporary annulus sector region 210 has its center at DP1 and has a temporary outer arc shaped edge 212 and a temporary inner arc shaped edge 214. The temporary annulus sector region 210 may substantially be a mathematical annulus sector region. Hence, the inner arc shaped edge 214 may be associated with a first circle, and the outer arc shaped edge 212 may be associated with a second circle, the first and second circle having different radii, r1, r2. A ratio between these radii may lie in the range $0.9 < r1/r2 < 1.1$. Preferably, r1/r2 is a number being relatively close to 1 such that being in the range $0.98 < r1/r2 < 1.02$.

Figure 3:
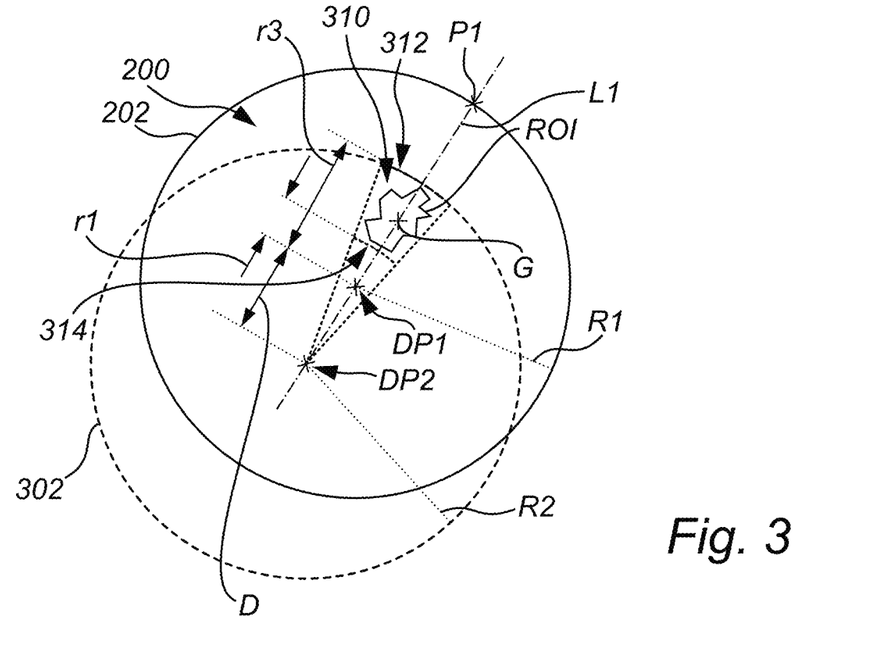
FIG. 3 schematically shows a dewarping pole shift of a fisheye view image.

The method 100 further comprises defining 140 a second dewarping pole, DP2, in the fisheye view image 200 at a dewarping pole moving distance, D, from DP1 along a radial direction extending from G of the ROI through the DP1. The radial direction hence substantially coincides with a radial variable of the polar coordinate system of the fisheye view image 100. The radial direction is further directed such that DP1 is located between DP2 and G. This is schematically illustrated in FIG. 3.

The method 100 further comprises setting 150 a dewarping annulus sector region 310 of the fisheye view image 200 such that the dewarping annulus sector region 310 comprises the ROI, and such that the dewarping annulus sector region 310 has its center at DP2 and has its dewarping inner arc shaped edge maintained at a same radial distance r1 from DP1 as the temporary inner arc shaped edge. However, the shape of the dewarping inner arc shaped edge 314 differ from the inner arc shaped edge 214, since a radius of curvature of the dewarping inner arc shaped edge 314 is larger than a radius of curvature of the inner arc shaped edge 214 after defining the second dewarping pole, DP2. Conversely, a radius of curvature of a dewarping outer arc shaped edge 312 is larger than a radius of curvature of the outer arc shaped edge 212 after defining the second dewarping pole, DP2. A fisheye view image radius R1 of a circular edge 202 of the fisheye view image 200 may differ from a radius R2 of a second circle 302 having the second dewarping pole DP2 as its center. Preferably, the radii R1 and R2 have similar magnitudes. By way of example, a ratio between these radii may lie in a range of $0.9 < R1/R2 < 1.1$. Notice that a shape and a scale of the ROI is similar before and after moving the dewarping pole.

The method 100 further comprises dewarping 160 the dewarping annulus sector region 310 of the fisheye view image 200. The dewarping 160 may be performed using any adequate transformation algorithm for dewarping between the coordinate system of the fisheye view image and an optional coordinate system. Preferably, the optional coordinate system is a cartesian coordinate system, to substantially regain an undistorted geometry of the ROI provided the second dewarping pole, DP2, has been properly positioned as per the above. The substantially regained undistorted geometry of the ROI may then be used in, e.g., an object detection, classification and/or recognition algorithm.

The dewarping annulus sector region 310 may be set such that its dewarping outer arc shaped edge 312 is maintained at a same radial distance from DP1 as the temporary outer arc shaped edge 212. Hence r2 and r3 in FIGS. 2 and 3 may be substantially similar. It is thereby implied that an area of the dewarping annulus sector region 310 is smaller than an area of the temporary annulus sector region 210.

Figure 4:
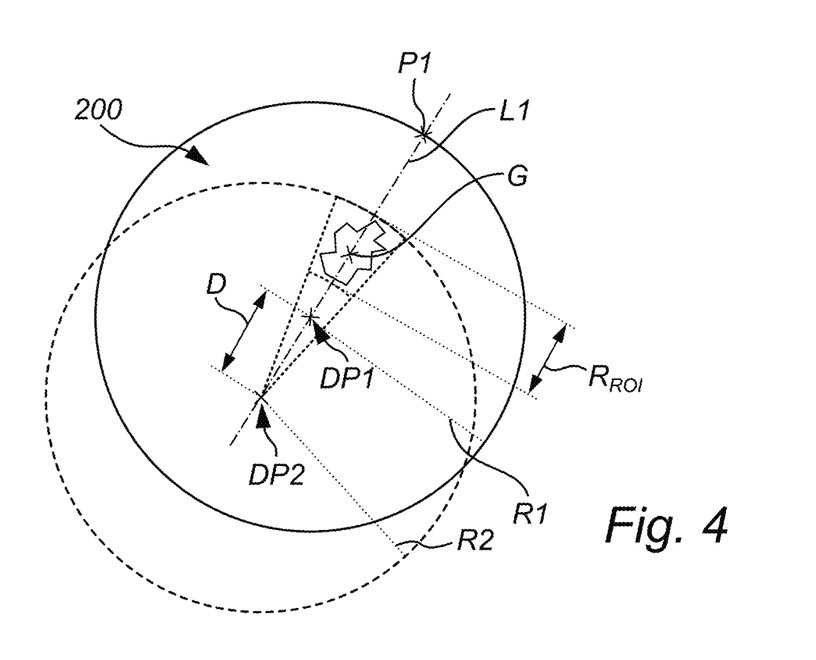
FIG. 4 schematically shows further details in connection with a definition of a second dewarping pole of a fisheye view image.

In connection with FIG. 4 the dewarping pole movement and details of the ROI is further emphasized. The method 100 may further comprise calculating D to be equal to a radial distance, R, between G of the ROI and a point, P1, on an edge 202 of the fisheye view image 200 such that DP2, G and P1 are located on a same straight line L1, wherein G is located between DP2 and P1.

Figure 5:
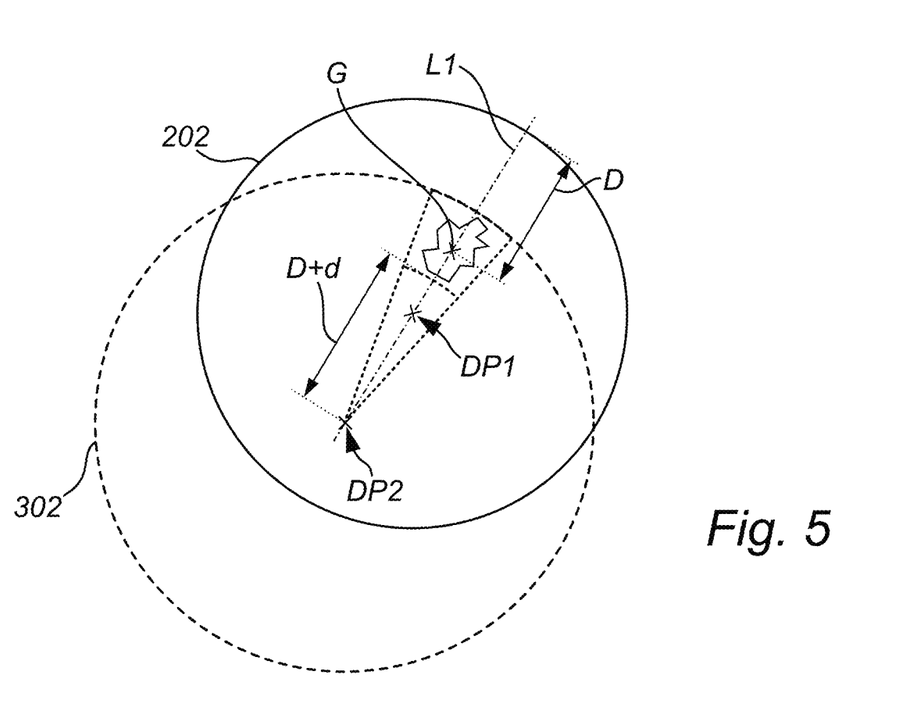
FIG. 5 schematically shows a tolerance of a dewarping pole shift of a fisheye view image.

A tolerance of the dewarping pole moving distance D may be a radial extension, $R_{ROI}$, of the ROI such that $R-R_{ROI}<D<R+R_{ROI}$. This is schematically shown in FIG. 5. Hence, there may be cases where R2>R1, provided the dewarping outer arc shaped edge 312 is maintained at a same radial distance from DP1 as the temporary outer arc shaped edge 212, and the dewarping pole moving distance is D+d, d lying in the range $0<d<R_{ROI}$. However, a preferred dewarping pole moving distance is the dewarping pole moving distance D as of, e.g., FIG. 4. A case where the dewarping pole moving distance is larger than D is shown in FIG. 5, where the second circle 302 is larger than the circular edge 202 of the fisheye view image 200. A dewarping accuracy may be a tradeoff between the dewarping pole moving distance D, the radial extension $R_{ROI}$ of the ROI relative to the radius R1 of the fisheye view image, and possibly the radial location of G of the ROI if, e.g., the ROI has a highly irregular geometry in the fisheye view image 200.

Figure 6:
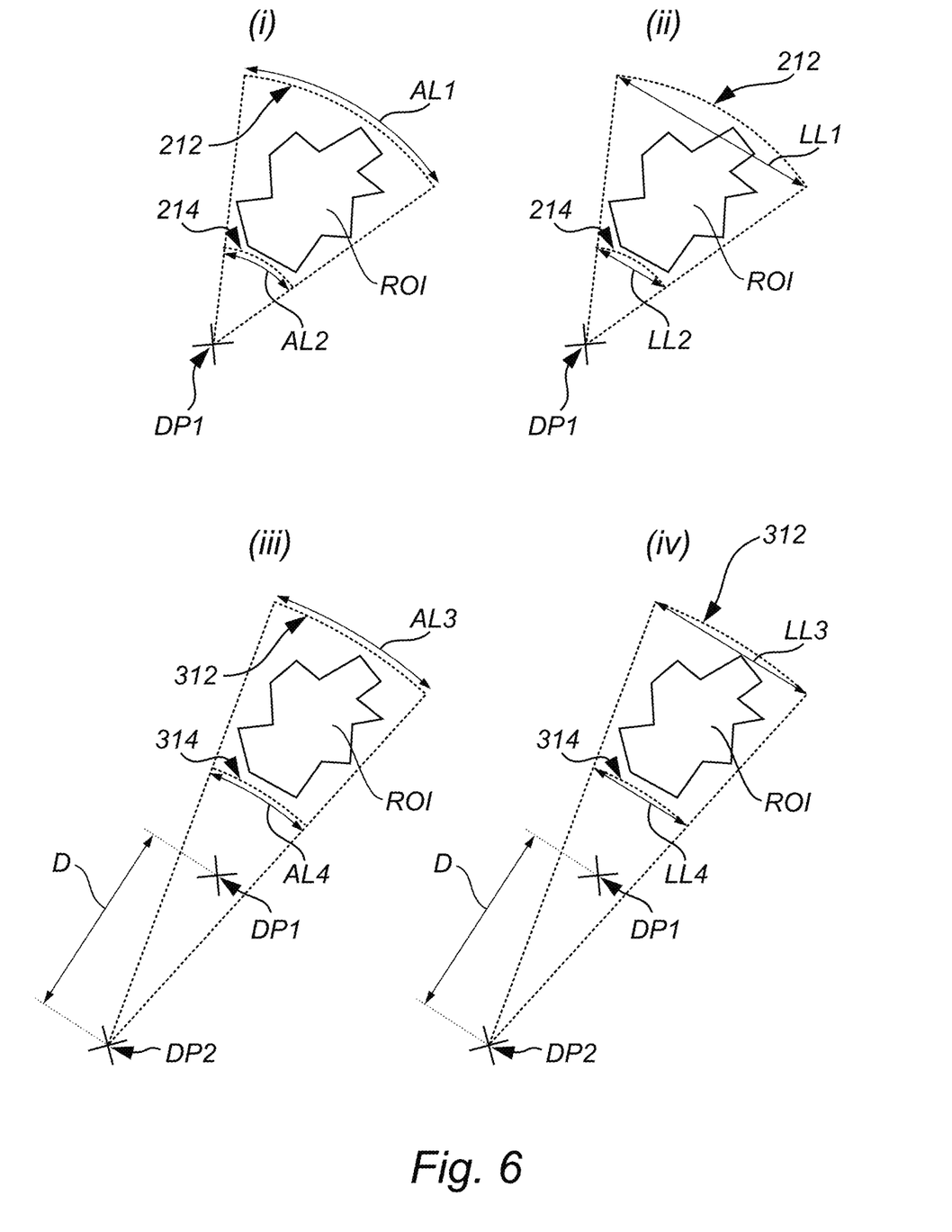
FIGS. 6A-6D show further details of how to calculate a dewarping pole shift of a fisheye view image.

In connection with FIGS. 6A-6D, there is shown further details of how to define the second dewarping pole, DP2. The definition of DP2 may comprise calculating, by a first calculation procedure, a temporary arc ratio by a length AL1 of the temporary outer arc shaped edge 212 divided by a length AL2 of the temporary inner arc shaped edge 214; see FIG. 6A. Alternatively, the temporary arc ratio may be calculated, by a second calculation procedure, by a length LL1 of a line segment LL1 joining a first and a second endpoint of the temporary outer arc shaped edge 212 divided by a length LL2 of a line segment LL2 joining a first and a second endpoint of the temporary inner arc shaped edge 214; FIG. 6B. It is to be noted that the first and the second calculation procedure above yield similar ratios. The definition of DP2 may further comprise comparing the temporary arc ratio with a threshold arc ratio. Provided the temporary arc ratio exceeds the threshold arc ratio, calculation of D may be done by requiring a dewarping arc ratio to be equal to or below the threshold arc ratio. The dewarping arc ratio is calculated similarly as the temporary arc ratio, i.e., by a length AL3 of the dewarping outer arc shaped edge 312 divided by a length AL4 of the dewarping inner arc shaped edge 314; FIG. 6C. Alternatively, the dewarping arc ratio may be calculated by a length LL3 of a line segment LL3 joining a first and a second endpoint of the dewarping outer arc shaped edge 312 divided by a length LL4 of a line segment LL4 joining a first and a second endpoint of the dewarping inner arc shaped edge 314; FIG. 6D. Again, it is appreciated that these calculation procedures yield similar ratios. Once the arc lengths of the dewarping outer arc shaped edge 312 and the dewarping inner arc shaped edge 314 have been calculated, a common second dewarping pole, DP2, of these arcs can be readily obtained. Alternatively, the location of the second dewarping pole, DP2, can be calculated iteratively. In such a situation, DP2, may be initially located by a random or qualified guess, whereafter the arc ratio is calculated. If the arc ratio lies outside the threshold arc ratio, the location of DP2 is to be updated accordingly. The updating may be performed using any adequate technique, such as utilizing Monte Carlo methods or the like.

The dewarping 160 of the dewarping annulus sector region 310 of the fisheye view image 200 may comprise, by a coordinate transformation, calculating a transformation from a spherical-coordinate representation of the dewarping annulus region to a rectilinear-coordinate representation of the dewarping annulus region 310. The dewarping annulus sector region 310 may thereby be viewed as an equirectangular projection of the fisheye view image 200.

Projecting a spherical image onto a two-dimensional sheet/screen induce image distortion, where a local degree of image distortion depends on a location of a specific image region of the spherical image. For instance, mapping the surface of Earth, being a spherically shaped two-dimensional surface, onto a flat two-dimensional surface induces a local image distortion being inversely proportional to a distance to the North- or the South pole, whereas the local distortion is minimal in vicinity of the Equator. By way of example, the apparent area of Antarctica in such a projection is often mapped being excessively large relative to continents located closer to the Equator such as Africa or Central America. That is, a real-world area ratio between Antarctica and Africa differ significantly compared to a two-dimensional representation of these continents. Hence, depending on a location of a geometrical pole, specific locations on the spherical image may be configured to be subject to minimal distortion. Shifting the location of a geometrical pole may thereby reduce a local distortion on a certain location while, simultaneously, increasing a local distortion in other locations. In other words, the first dewarping pole, DP1, of the fisheye view image 200 may be viewed as the above-described geometrical pole when representing the fisheye view image 200 by a half sphere in a spherical coordinate system. The definition of the second dewarping pole, DP2, may thereby be viewed as moving the geometrical pole to reduce a local distortion of the ROI.

Figure 7:
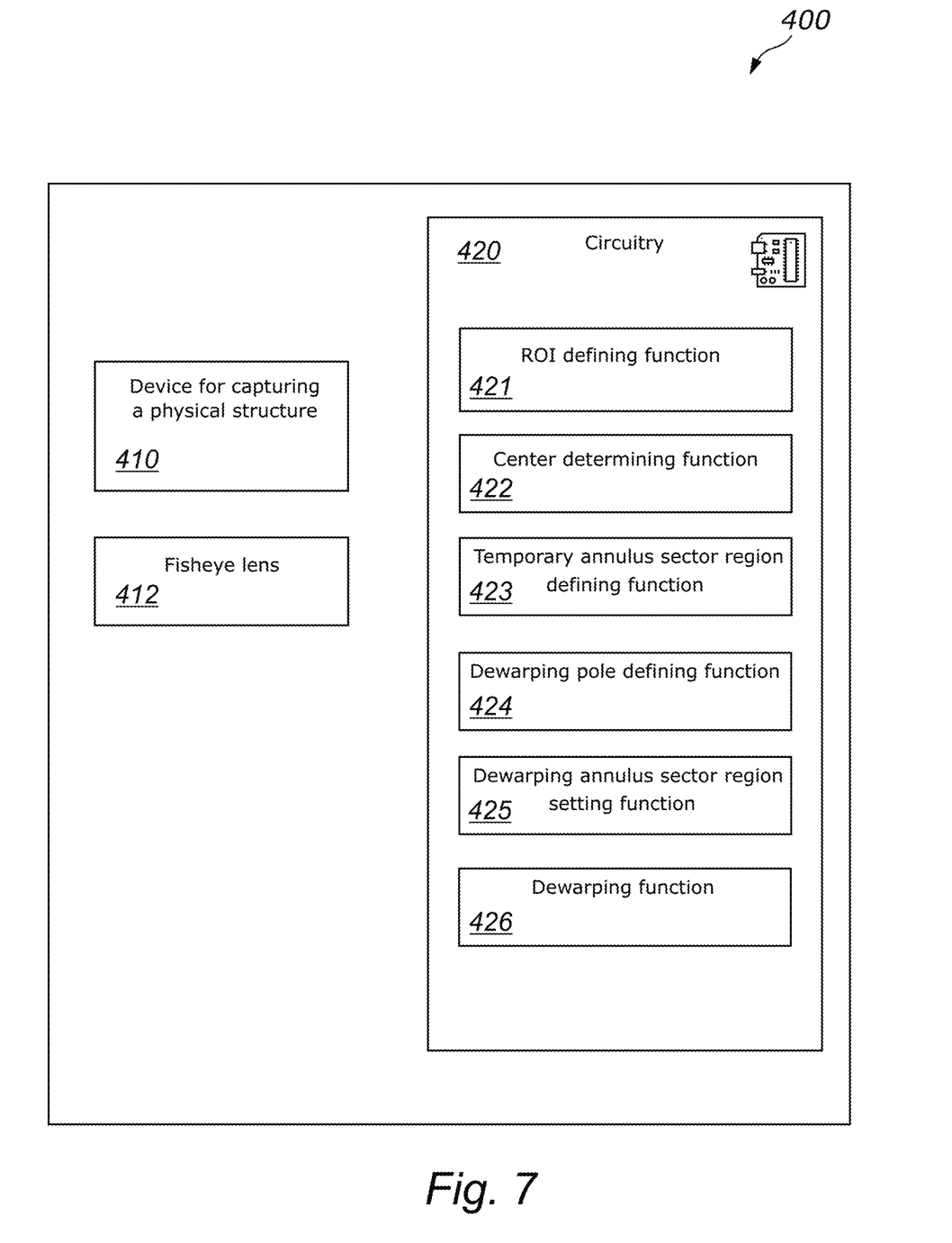
FIG. 7 schematically shows an electronic device on which the disclosed method is implemented.

In connection with FIG. 7 there is shown, highly schematically, an electronic device 400 on which the above-described method 100 is implemented. Several features of the electronic device 400 have already been described in connection with the method above. To avoid undue repetition, reference is made to the above, when applicable.

The electronic device 400 may comprise a device 410 for capturing a digital representation of a physical structure of an environment. The device may be an ordinary digital camera for, e.g., ceiling or wall mounting, comprising an imaging sensor. The electronic device 400 may further comprise a fisheye lens 412 for providing a fisheye view image 200. The fisheye lens 412 may be of any type, as per the above description. The electronic device 400 further comprises circuitry 420. The circuitry 420 is configured to execute a region of interest, ROI, defining function 421 configured to define a ROI within the fisheye view image 200. The circuitry 420 is further configured to execute a center determining function 422 configured to determine a center, G, of the ROI. The circuitry 420 is further configured to execute a temporary annulus sector region defining function 423 configured to define a temporary annulus sector region 210 of the fisheye view image 200 such that the temporary annulus sector region 210 comprises the ROI, and such that the temporary annulus sector region 210 has its center at a first dewarping pole, DP1, of the fisheye view image 200 and has a temporary outer arc shaped edge 212 and a temporary inner arc shaped edge 214. The circuitry 420 is further configured to execute a dewarping pole defining function 424 configured to define a second dewarping pole, DP2, in the fisheye view image 200 at a dewarping pole moving distance, D, from DP1 along a radial direction extending from G of the ROI through the DP1. The circuitry 420 is further configured to execute a dewarping annulus sector region setting function 425 configured to set a dewarping annulus sector region 310 of the fisheye view 200 image such that the dewarping annulus sector region 310 comprises the ROI, and such that the dewarping annulus sector region 310 has its center at DP2 and has its dewarping inner arc shaped edge 314 maintained at a same radial distance R1 from DP1 as the temporary inner arc shaped edge 214. The circuitry 420 is further configured to execute a dewarping function 426 configured to dewarp the dewarping annulus sector region 310 of the fisheye view image 200.

The dewarping annulus sector region setting function 425 may comprise a shifting function configured to set the dewarping annulus sector region 310 such that its dewarping outer arc shaped edge 312 is maintained at a same radial distance from DP1 as the temporary outer arc shaped edge 212.

The circuitry 420 may be further configured to execute a distance calculating function configured to calculate D to be equal to a radial distance, R, between G of the ROI and a point, P1, on an edge 202 of the fisheye view image such that DP2, G and P1 are located on a same straight line L1, wherein G is located between DP2 and P1.

The dewarping pole defining function 424 may further be configured to, by a distance calculating function configured to calculate D to be equal to a radial distance, R, between G of the ROI and a point, P1, on an edge of the fisheye view image such that DP2, G and P1 are located on a same straight line L1, wherein G is located between DP2 and P1, include a tolerance of the dewarping pole moving distance D being a radial extension, $R_{ROI}$, of the ROI such that $R-R_{ROI}<D<R+R_{ROI}$.

The dewarping pole defining function 424 may comprise a temporary arc ratio calculating function configured to calculate a temporary arc ratio by either of a length AL1 of the temporary outer arc shaped edge 212 divided by a length AL2 of the temporary inner arc shaped edge 214 or a length LL1 of a line segment LL1 joining a first and a second endpoint of the temporary outer arc shaped edge 212 divided by a length LL2 of a line segment LL2 joining a first and a second endpoint of the temporary inner arc shaped edge 214. The dewarping pole defining function 424 may further comprise a comparing function configured to compare the temporary arc ratio with a threshold arc ratio. The dewarping pole defining function 424 may further comprise an arc ratio condition function configured to, provided the temporary arc ratio exceeds the threshold arc ratio, calculate D by requiring a dewarping arc ratio to be equal to or below the threshold arc ratio. The dewarping arc ratio may be calculated by either of a length AL3 of the dewarping outer arc shaped edge 312 divided by a length AL4 of the dewarping inner arc shaped edge 314 or a length LL3 of a line segment joining a first and a second endpoint of the dewarping outer arc shaped edge 312 divided by a length LL4 of a line segment joining a first and a second endpoint of the dewarping inner arc shaped edge 314.

The dewarping function 426 may further be configured to, by a coordinate transformation, calculate a transformation from spherical-coordinate representation of the dewarping annulus sector region 310 to a rectilinear-coordinate representation of the dewarping annulus sector region 310, the dewarping annulus sector region thereby being an equirectangular projection of the fisheye view image 200.

Other features and embodiments of the electronic device may be applicable to the above-mentioned specification of the method 100.

The person skilled in the art realizes that the present disclosure by no means is limited to the preferred embodiments described above. On the contrary, many modifications and variations are possible within the scope of the appended claims.

Additionally, variations to the disclosed embodiments can be understood and effected by the skilled person in practicing the claimed disclosure, from a study of the drawings, the disclosure, and the appended claims.

The invention claimed is:

1. A computer implemented method for dewarping a region of a fisheye view image, wherein the fisheye view image is captured by a fisheye lens camera and comprises a first dewarping pole, DP1, the method comprising:
    defining a region of interest, ROI, within the fisheye view image;
    determining a center, G, of the ROI;
    defining a temporary annulus sector region of the fisheye view image such that the temporary annulus sector region comprises the ROI, and such that the temporary annulus sector region has its center at DP1 and has a temporary outer arc shaped edge and a temporary inner arc shaped edge;
    defining a second dewarping pole, DP2, in the fisheye view image at a dewarping pole moving distance, D, from DP1 along a radial direction extending from G of the ROI through the DP1, wherein the radial direction is further directed such that DP1 is located between DP2 and G;
    setting a dewarping annulus sector region of the fisheye view image such that the dewarping annulus sector region comprises the ROI, and such that the dewarping annulus sector region has its center at DP2 and has its dewarping inner arc shaped edge maintained at a same radial distance, along the radial direction extending from G of the ROI through the DP1, from DP1 as the temporary inner arc shaped edge; and
    dewarping the dewarping annulus sector region of the fisheye view image.

2. The method according to claim 1, wherein the dewarping annulus sector region is set such that its dewarping outer arc shaped edge is maintained at a same radial distance, along the radial direction extending from G of the ROI through the DP1, from DP1 as the temporary outer arc shaped edge.

3. The method according claim 1, further comprising calculating D to be equal to a radial distance, R, between G of the ROI and a point, P1, on an edge of the fisheye view image such that DP2, G and P1 are located on a same straight line, wherein G is located between DP2 and P1.

4. The method according to claim 1, further comprising calculating D to be equal to a radial distance, R, between G of the ROI and a point, P1, on an edge of the fisheye view image such that DP2, G and P1 are located on a same straight line, wherein G is located between DP2 and P1 wherein a tolerance of the dewarping pole moving distance D is a radial extension, $R_{ROI}$, of the ROI such that:

$$R-R_{ROI}<D<R+R_{ROI}.$$

5. The method according claim 1, wherein the definition of DP2 comprises:
calculating a temporary arc ratio by either of:
a length of the temporary outer arc shaped edge divided by a length of the temporary inner arc shaped edge, or
a length of a line segment joining a first and a second endpoint of the temporary outer arc shaped edge divided by a length of a line segment joining a first and a second endpoint of the temporary inner arc shaped edge,
comparing the temporary arc ratio with a threshold arc ratio,
provided the temporary arc ratio exceeds the threshold arc ratio, calculating D by requiring a dewarping arc ratio to be equal to or below the threshold arc ratio, the dewarping arc ratio being calculated by either of:
a length of the dewarping outer arc shaped edge divided by a length of the dewarping inner arc shaped edge, or
a length of a line segment joining a first and a second endpoint of the dewarping outer arc shaped edge divided by a length of a line segment joining a first and a second endpoint of the dewarping inner arc shaped edge.

6. The method according to claim 1, wherein the dewarping of the dewarping annulus sector region of the fisheye view image comprises, by a coordinate transformation, calculating a transformation from a spherical-coordinate representation of the dewarping annulus sector region to a rectilinear-coordinate representation of the dewarping annulus sector region, the dewarping annulus sector region thereby being an equirectangular projection of the fisheye view image.

7. A non-transitory computer-readable storage medium having stored thereon instructions for implementing a method when executed on a device having processing capabilities, for dewarping a region of a fisheye view image, wherein the fisheye view image is captured by a fisheye lens camera having a first dewarping pole, DP1, the method comprising:
defining a region of interest, ROI, within the fisheye view image;
determining a center, G, of the ROI;
defining a temporary annulus sector region of the fisheye view image such that the temporary annulus sector region comprises the ROI, and such that the temporary annulus sector region has its center at DP1 and has a temporary outer arc shaped edge and a temporary inner arc shaped edge;
defining a second dewarping pole, DP2, in the fisheye view image at a dewarping pole moving distance, D, from DP1 along a radial direction extending from G of the ROI through the DP1, wherein the radial direction is further directed such that DP1 is located between DP2 and G;
setting a dewarping annulus sector region of the fisheye view image such that the dewarping annulus sector region comprises the ROI, and such that the dewarping annulus sector region has its center at DP2 and has its dewarping inner arc shaped edge maintained at a same radial distance, along the radial direction extending from G of the ROI through the DP1, from DP1 as the temporary inner arc shaped edge; and
dewarping the dewarping annulus sector region of the fisheye view image.

8. An electronic device comprising circuitry configured to execute:
a region of interest, ROI, defining function configured to define a ROI within the fisheye view image;
a center determining function configured to determine a center, G, of the ROI;
a temporary annulus sector region defining function configured to define a temporary annulus sector region of the fisheye view image such that the temporary annulus sector region comprises the ROI, and such that the temporary annulus sector region has its center at a first dewarping pole, DP1, of the fisheye view image and has a temporary outer arc shaped edge and a temporary inner arc shaped edge;
a dewarping pole defining function configured to define a second dewarping pole, DP2, in the fisheye view image at a dewarping pole moving distance, D, from DP1 along a radial direction extending from G of the ROI through the DP1, wherein the radial direction is further directed such that DP1 is located between DP2 and G;
a dewarping annulus sector region setting function configured to set a dewarping annulus sector region of the fisheye view image such that the dewarping annulus sector region comprises the ROI, and such that the dewarping annulus sector region has its center at DP2 and has its dewarping inner arc shaped edge maintained at a same radial distance, along the radial direction extending from G of the ROI through the DP1, from DP1 as the temporary inner arc shaped edge; and
a dewarping function configured to dewarp the dewarping annulus sector region of the fisheye view image.

9. The electronic device according to claim 8, wherein the dewarping annulus sector region setting function comprises a shifting function configured to set the dewarping annulus sector region such that its dewarping outer arc shaped edge is maintained at a same radial distance, along the radial direction extending from G of the ROI through the DP1, from DP1 as the temporary outer arc shaped edge.

10. The electronic device according to claim 8, wherein the circuitry is further configured to execute a distance calculating function configured to calculate D to be equal to a radial distance, R, between G of the ROI and a point, P1, on an edge of the fisheye view image such that DP2, G and P1 are located on a same straight line, wherein G is located between DP2 and P1.

11. The electronic device according to claim 8, wherein the dewarping pole defining function is further configured to, by a distance calculating function, calculate D to be equal to a radial distance, R, between G of the ROI and a point, P1, on an edge of the fisheye view image such that DP2, G and P1 are located on a same straight line, wherein G is located between DP2 and P1, include a tolerance of the dewarping pole moving distance, D, being a radial extension, $R_{ROI}$, of the ROI such that:

$$R-R_{ROI}<D<D+R_{ROI}.$$

12. The electronic device according to claim 8, wherein the dewarping pole defining function comprises:
a temporary arc ratio calculating function configured to calculate a temporary arc ratio by either of:

a length of the temporary outer arc shaped edge divided by a length of the temporary inner arc shaped edge, or a length of a line segment joining a first and a second endpoint of the temporary outer arc shaped edge divided by a length of a line segment joining a first and a second endpoint of the temporary inner arc shaped edge, a comparing function configured to compare the temporary arc ratio with a threshold arc ratio, an arc ratio condition function configured to, provided the temporary arc ratio exceeds the threshold arc ratio, calculate D by requiring a dewarping arc ratio to be equal to or below the threshold arc ratio, wherein the dewarping arc ratio is calculated by either of:

a length of the dewarping outer arc shaped edge divided by a length of the dewarping inner arc shaped edge, or a length of a line segment joining a first and a second endpoint of the dewarping outer arc shaped edge divided by a length of a line segment joining a first and a second endpoint of the dewarping inner arc shaped edge.

13. The electronic device according to claim 8, wherein the dewarping function is further configured to, by a coordinate transformation, calculate a transformation from spherical-coordinate representation of the dewarping annulus sector region to a rectilinear-coordinate representation of the dewarping annulus sector region, the dewarping annulus sector region thereby being an equirectangular projection of the fisheye view image.

\* \* \* \* \*